(12) United States Patent
Balseiro

(10) Patent No.: US 10,130,045 B2
(45) Date of Patent: Nov. 20, 2018

(54) LIVING ART FRAME

(71) Applicant: Lazaro Balseiro, Yonkers, NY (US)

(72) Inventor: Lazaro Balseiro, Yonkers, NY (US)

( * ) Notice: Subject to any disclaimer, the term of this patent is extended or adjusted under 35 U.S.C. 154(b) by 102 days.

(21) Appl. No.: 15/406,053

(22) Filed: Jan. 13, 2017

(65) Prior Publication Data

US 2018/0199521 A1    Jul. 19, 2018

(51) Int. Cl.
*A01G 9/02* (2018.01)
*A47G 1/06* (2006.01)

(52) U.S. Cl.
CPC .............. *A01G 9/025* (2013.01); *A47G 1/06* (2013.01); *A47G 2001/0683* (2013.01)

(58) Field of Classification Search
CPC ........ A01G 9/025; A01G 9/022; A01G 31/00; A01G 31/02; A01G 9/02; A47G 2001/0683; G09F 19/00
See application file for complete search history.

(56) References Cited

U.S. PATENT DOCUMENTS

| | | | | |
|---|---|---|---|---|
| 3,869,829 A * | 3/1975 | Chiosso | ................. | A01G 9/025 40/409 |
| 4,212,133 A * | 7/1980 | Lufkin | ..................... | A01G 5/00 248/488 |
| 5,057,344 A * | 10/1991 | Mealey | ..................... | A01G 5/04 428/13 |
| 5,085,002 A * | 2/1992 | Lee | ........................... | A01G 9/00 428/14 |
| 6,634,138 B2 * | 10/2003 | Katzman | ................ | A01G 9/022 239/12 |
| 6,925,740 B2 * | 8/2005 | Shannon | ................. | G09F 19/00 40/124.5 |
| 9,032,665 B2 * | 5/2015 | Whitney | ................ | A01G 31/02 47/59 R |
| 2002/0084346 A1 * | 7/2002 | Katzman | ................ | A01G 9/022 239/17 |
| 2004/0139633 A1 * | 7/2004 | Shannon | ................. | G09F 19/00 40/124.5 |
| 2008/0022590 A1 * | 1/2008 | Chen | ...................... | A01G 9/022 47/72 |

FOREIGN PATENT DOCUMENTS

| | | | | |
|---|---|---|---|---|
| CA | 2374103 A1 * | 12/2000 | ........... | A47G 1/0616 |
| DE | 202011100909 U1 * | 6/2011 | ............. | A01G 9/022 |
| EP | 0329876 A1 * | 8/1989 | ............. | A01G 9/022 |

\* cited by examiner

*Primary Examiner* — Kristen C Hayes
(74) *Attorney, Agent, or Firm* — Leason Ellis LLP

(57) ABSTRACT

A living art article incorporates traditional art elements and also incorporates a living element in the form of a living plant, including cut flowers, etc.

19 Claims, 3 Drawing Sheets

LIVING ART FRAME

TECHNICAL FIELD

The present invention relates to art work and more particularly, relates to living art in which live plants are incorporated into the art work which is configured to hang on a wall or otherwise be supported on a wall.

BACKGROUND

Art comes in many different forms with one type of art being framed art that is intended to be secured to a wall for display thereof. Traditional framed art includes paintings and the like. There is a need for an improved framed art experience that not only incorporates traditional art elements but also incorporates a living element in the form of a living plant, including cut flowers, etc.

SUMMARY

The present invention provides a living art article that incorporates traditional art elements and also incorporates a living element in the form of a living plant, including cut flowers, etc.

A living art article in accordance with one embodiment of the present invention includes a rear frame member that is configured for attachment to a support surface and a front art medium that is coupled to the rear frame member. The front art medium includes graphic indicia and includes a first receptacle that protrudes outwardly from a front face of the front art medium. The first receptacle has a closed first end and an opposite open second end. The first receptacle is configured for receiving and holding a liquid. The living art article also includes a drain assembly that is associated with at least one of the rear frame member and the front art medium. The drain assembly has a drain line that is in fluid communication with a hollow interior of the first receptacle and is in communication with a drain outlet that is accessible along one of the rear frame member and the front art medium.

BRIEF DESCRIPTION OF THE DRAWING FIGURES

DETAILED DESCRIPTION OF PREFERRED EMBODIMENTS

Figure 1:
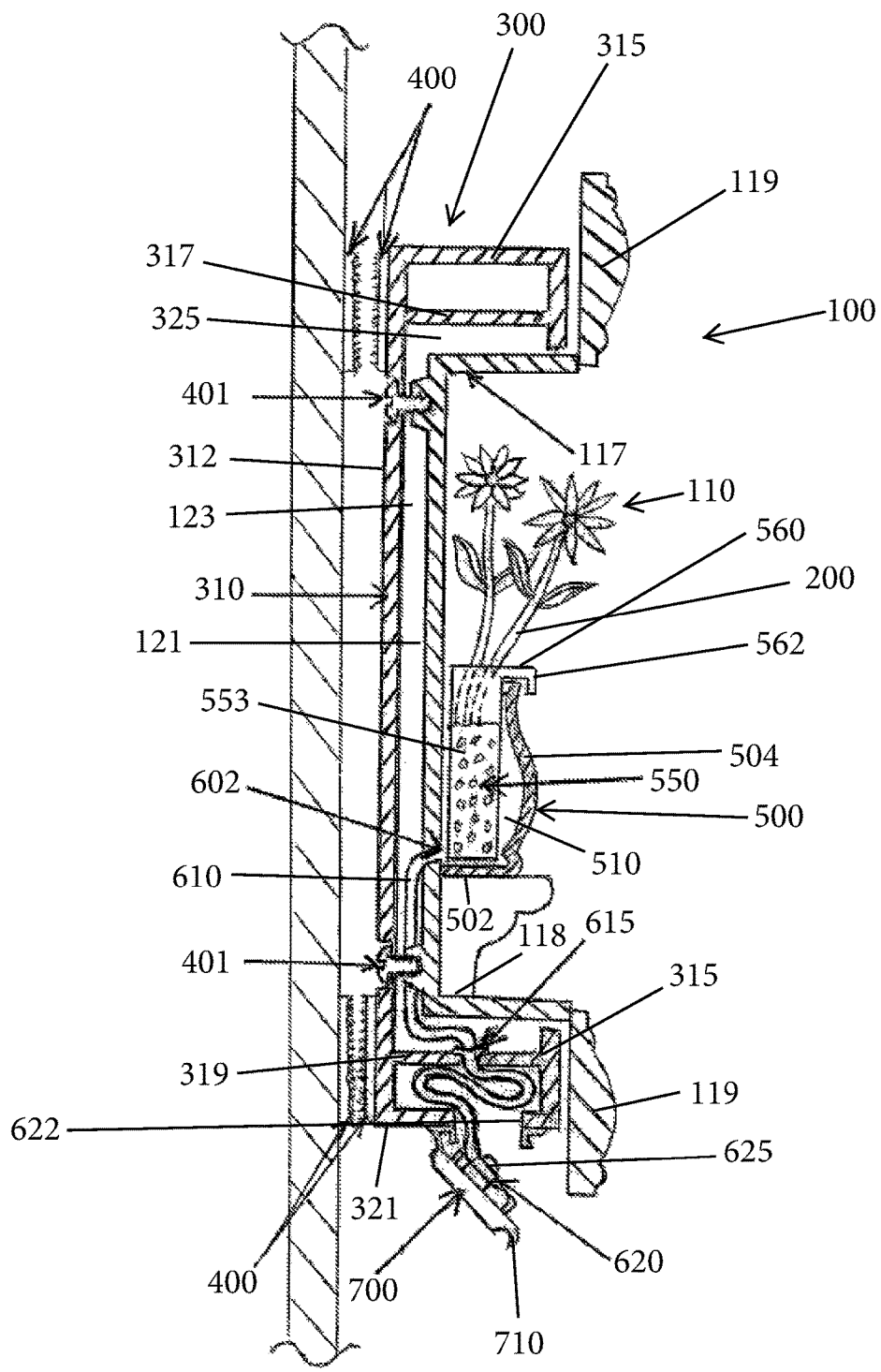
FIG. 1 is a cross-sectional side view of a living art frame according to one embodiment.
Figure 2:
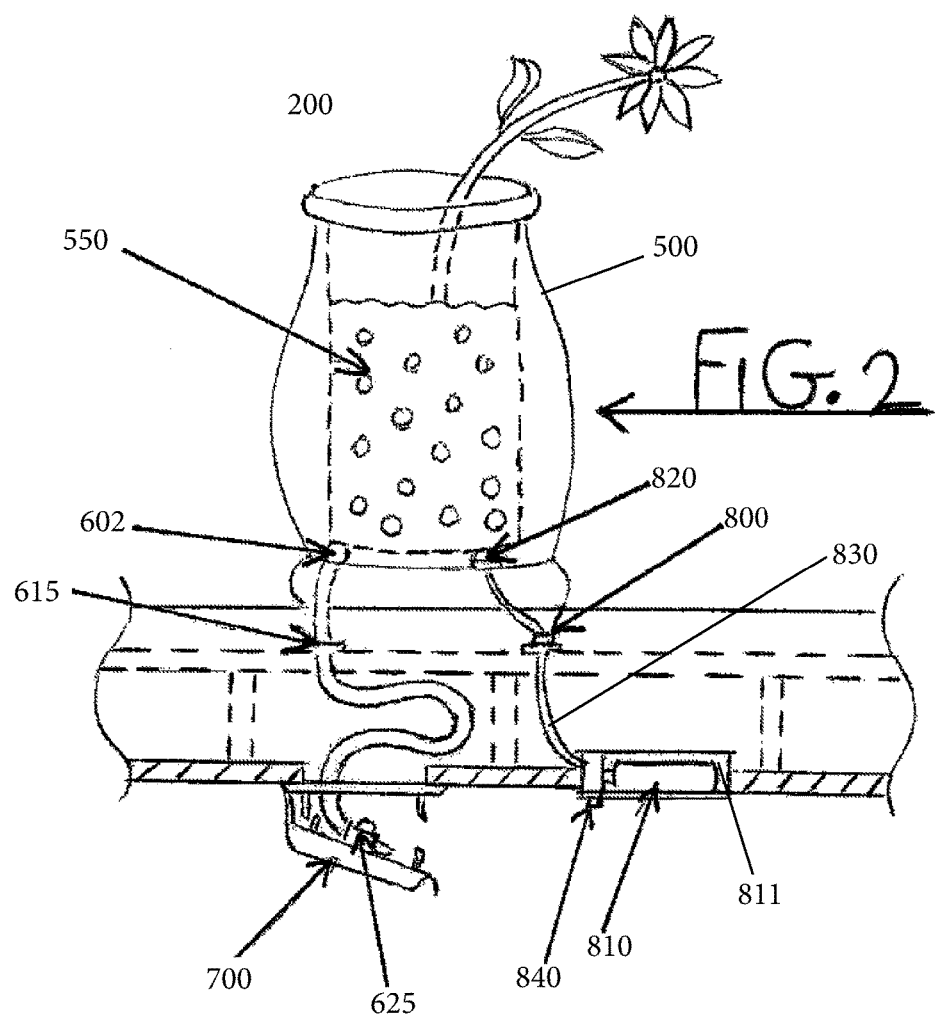
FIG. 2 is a front partial cross-sectional view showing a receptacle with removable insert which forms a part of the living art frame of FIG. 1.
Figure 3:
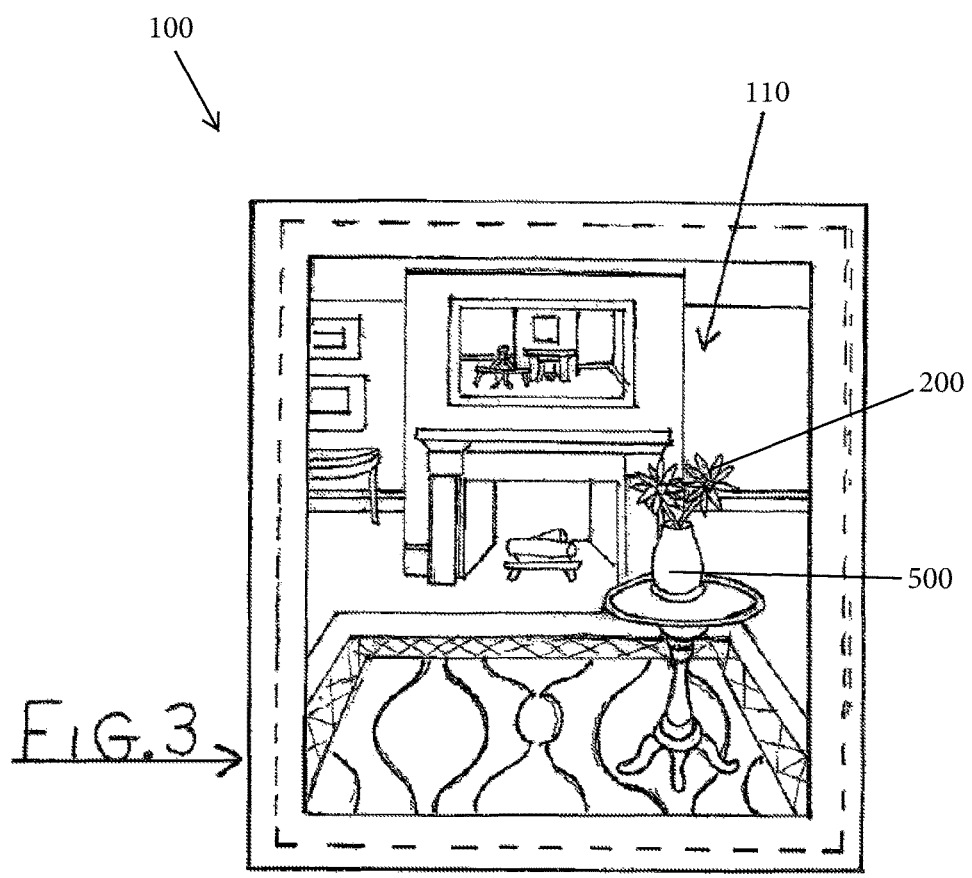
FIG. 3 is a front elevation view of showing a living art picture according to one exemplary embodiment.

FIGS. 1-3 illustrate a living art article 100 according to one exemplary embodiment. As discussed herein, the living art article 100 can take any number of different forms and can come in any number of different shapes and sizes and further can include any number of different graphic art indicia. As mentioned herein, the living art article 100 is configured such that it incorporates living plant matter, such as cut flowers or a live plant, into the artwork itself and therefore, the living art article 100 broadly includes an art medium 110 and a living art component 200 that is incorporated into the art medium 110.

The living art article 100 is configured to be supported on a wall and is thus configured to be supported on a wall or other support surface. More specifically, the living art article 100 is formed of a number of parts (components) that are assembled together. In particular, the living art article 100 includes the art medium 110 and a frame 300 to which the art medium 110 is coupled.

The frame 300 can take any number of different forms so long as the frame 300 is configured to be both attached to the wall (support surface) and also support the medium 110 and the living art component 200. In the illustrated embodiment, the frame 300 includes a rear base 310 that includes a rear surface 312 that faces the wall (support surface). The frame 300 also includes a front portion 315 that is defined by a number of protruding elements that extend outwardly in a direction away from the rear surface 312 of the rear base 310. For example, the front portion 315 can define a peripheral border of the rear base 310 that extends forward away from the support wall to which the frame 300 is attached. The front portion 315 is preferably a continuous structure in that the protruding elements interconnect with one another or are placed in abutting relationship so as to define the continuous frame structure.

In the illustrated embodiment when the living art article 100 is square or rectangular shaped, the front portion 315 defines a continuous square or rectangular shaped structure. As shown, the protruding elements that define the front portion 315 can each be a hollow structure. In the cross-sectional view of FIG. 1, a top protruding element 317 is shown along with a bottom protruding element 319 that both are part of the front portion 315. Between the protruding elements that define the front frame 315 is a recessed space 325 that is intended to receive the art medium 110 as described below.

The rear surface 312 of the frame 310 is configured to be attached to the wall (support surface). Any number of different techniques can be used to detachably couple the frame 300 to the wall (support surface). For example, fasteners 400 or the like can be used to hang the living art article 100 on the wall. Any number of different types of fasteners 400 can be used including but not limited to nails, screws, hook and loop fasteners, hooks, wire, clips, etc. For purpose of illustration only, fasteners 400 in the form of hook and loop material are shown; however, as mentioned, any number of other types of fasteners can equally be used.

The art medium 110 is generally in the form of a structure on which the artwork is displayed but also is configured to be mated to the frame 310. In particular, the art medium 110 can generally comprise a frame structure that includes a center portion and a peripheral border portion as described below. The art medium 110 can take any number of shapes, including but limited to, circular, oval, square, rectangular, triangular, etc.

The art medium 110 can thus also be in form of a frame and comprises an outer frame structure which is constructed such that a portion 117 thereof is received within the recessed space 325 of the frame. The portion 117 of the outer structure can thus be a center portion with a peripheral border portion 119 being defined around the center portion 117. As shown, the center portion 117 extends outwardly and rearwardly from the peripheral border portion 119. As shown, a shoulder 118 can be formed between the portion 117 and the peripheral border portion 119. In other words, the portion 117 is recessed relative to the peripheral border portion 119.

The peripheral border portion 119 is constructed to conceal the front portion 315 and thus, the depth of the portion 117 relative to the peripheral border portion 119 is selected so that the front portion 315 can be received. The rear surface 121 of the portion 117 faces the front surface of the rear base 310 and in some embodiments can be placed in intimate contact therewith, or, as illustrated, the portion 117 can be mounted to the rear base 310 such that a gap or space 123 is formed therebetween. Any number of different techniques can be used to attach the portion 117 to the rear base 310 including, but not limited, to the use of fasteners 401, such as screws, nails, rivets, etc. FIG. 1 shows the use of screws 401 to attach the portion 117 to the rear base 310. It will be appreciated that the use of fasteners 401 to attach the portion 117 to the rear base 310 allows the user to customize and interchange different frames 110 with a common single rear base 310.

In accordance with the present invention, the rear base 310 can be thought of as being an inner or rear frame member, while the frame 110 can be thought of as being an outer frame that covers the inner frame member (rear base 310).

In accordance with the present invention and as discussed herein, the living art article 100 includes a living plant, flower, or the like, which is generally shown at 200. In order to accommodate the living plant 200, a receptacle 500 is provided as an integral part of the art medium 110. The receptacle 500 is associated with the portion 117 and in particular, the receptacle 500 protrudes outwardly from the portion 117 and thus, protrudes forward from the portion 117. The receptacle 500 is closed ended in that the receptacle 500 is closed at its bottom by a bottom wall 502. A side wall 504 is joined to the bottom wall 502 and can have a hemispherical shape due to the side wall 504 being connected to the portion 117. The receptacle 500 is open along its top so as to provide access to a hollow interior 510 of the receptacle 500. The bottom wall 502 joins the side wall 504 at a right angle and therefore, the bottom wall 502 is a planar surface that is intended to be parallel to a ground surface when the living art article 100 is properly hung. It will be appreciated that the receptacle 500 can take any number of different forms and have any number of different appearances. In addition, the appearance of the receptacle 500 can be incorporated into the appearance of the living art medium 110. For example, in the illustrated embodiment, the receptacle 500 has the appearance of a vase that sits upon a side table that is part of the living art medium 110.

While the living plant 200 is intended for reception in the hollow interior 510, the living plant 200 is preferably received within a removable inner receptacle or container 550 that is sized and configured to be received within the hollow interior 510 of the receptacle 500. The inner receptacle 550 can thus have a cylindrical shape or can have a hemi-spherical shape or any other shapes suitable for the intended use.

The hollow interior 510 of the receptacle 500 is intended to receive and hole a quantity of liquid, e.g., water.

As illustrated, the inner receptacle 550 can be in the form of a perforated liner. The inner receptacle 550 can thus be a structure that is closed at one end and open at another end much like a cup or vase. The side wall thereof includes holes 553. These holes 553 make the inner receptacle 550 act like a strainer or filter when it is lifted from the receptacle 500. The living plant 200 is thus first received within inner receptacle 550 which is then inserted into the liquid that is contained within the hollow interior 510 of the receptacle 500. The holes 553 allow the fluid to freely flow from the hollow interior 510 into the hollow interior of the inner receptacle 550 that contains the living plant 200, thereby providing the necessary water to the living plant/cut flowers 200. The holes 553 of the inner receptacle 500 are also designed to prevent the inner receptacle 550 from being clogged and allow the liquid to drain properly.

As shown in FIG. 1, the inner receptacle 550 can have at its open top end an outwardly extending flange member 560 that provides a means for easily grasping and inserting and removing the inner receptacle 550 from the hollow interior 510 of the receptacle 500. The flange member 560 has a downwardly extending lip 562 that extends downwardly over the top edge of the receptacle 500. The lip 562 is the structure that can be grasped by the user for manipulating the inner receptacle 550.

In accordance with the present invention, the living art article 100 has a drain that is fluidly connected to the hollow interior 510 of the receptacle 500. More specifically, the drain includes a drain opening 602 that is formed in the portion 117. The drain opening 602 thus forms an entrance into the hollow interior 510 is located at a bottom region of the receptacle 500 to permit proper draining. The drain opening 602 thus also opens into the space (gap) 123 formed between the portion 117 and the rear base 310. The drain also includes a drain line 610 that fluidly connects to the drain opening 602 and is disposed into the space 123 where it travels to a drain outlet 620. The drain line 610 can thus be in the form of a tube that travels within the space 123.

The drain outlet 620 is typically located at the bottom of the article 100 and as shown, the drain line 610 can be fed through an opening into the hollow interior of the bottom protruding element 319. A bottom wall 321 of the bottom protruding element 319 can include a door opening 622 about which an openable/closeable door 700 is attached. The door 700 can thus be pivotally attached to the bottom protruding element 319 and a door latch 710 is provided for releasably locking the door 700 in a closed position. An open free end of the drain line 610 is accessible by opening the door 700 to allow liquid from the receptacle 500 to be drained therefrom when the door 700 is in the open position.

In the illustrated embodiment, the free end of the drain line 610 can be coupled to the door 700 as by using a clip structure or as discussed herein can be connected via a valve member. In such a construction, when the door 700 opens, the free end of the drain line 610 is oriented in a downward direction to allow draining of the liquid.

As shown, the drain outlet 620 is oriented such that it is concealed by the peripheral border portion 119 and thus, when the door 700 is in the closed position, the drain outlet 620, including the door 700, is not visible during normal viewing of the living art article 100 (while being hung on the support surface, such as a wall).

The drain outlet 620 also includes a valve 625 or the like which allows for the controlled draining of the liquid from the receptacle. Any number of different types of valves can be used and generally, the valve is of a type that has two positions, namely an open position in which liquid is free to drain from the receptacle 500 and a closed position in which liquid is prevented from flowing from the receptacle 500. The valve 625 can be of a type that connects to the free end 611 of the drain line 610 and in such case, the body of the valve 625 can be mounted to an inner face of the door 700. Thus, when the user opens the door 700, the valve 625 is accessible to the user and can be moved between the open and closed positons. The valve 625 can be of a switch type or other mechanical actuator.

As shown, the drain line 610 can be formed of two or more segments of tubing with a connector 615 being used to connect the two segments of tubing. The first tube segment extends between the receptacle 500 and the connector 615, while the second tube segment extends between the connector 615 and the valve 625. The second tube segment thus terminates in the valve 625. The connector 615 can be of the type that attaches to the bottom protruding element 319 and in particular, can be set in the opening formed therein.

The drain outlet 620 thus provides an efficient, yet concealed, manner of draining the liquid from the receptacle 500. The drain outlet 620 thus provides a way to drain the liquid within the receptacle 500 to allow the liquid to be refreshed and/or permit complete drainage as when the living art article 100 is not in use or when living plants/flowers are not being used therewith. For example, if dry flowers or artificial flowers are placed into the receptacle 500, there is no need for water.

In yet another aspect, the living art article 100 can include a light feature for illumination of the receptacle 500. As shown in FIG. 2, a light assembly 800 can be provided and includes a power source 810 that is operatively connected to a light source 820 as by a wire 830 and there is an on/off actuator 840 for turning the light source 820 on and off. The power source 810 can be in the form of one or more batteries that are disposed in a compartment 811 that is accessible along the living art article 100. As shown, the compartment 811 can be located adjacent the door 700 and thus, is accessible along the bottom of the living art article 100. The light source 820 is positioned so that when it is turned on, the light source 820 illuminates the inside of the receptacle 500 and can cast backlighting along the art medium 110. The on/off actuator 840 can be in the form of a switch or button or the like that is accessible to the user. For example, the on/off actuator can be located within the compartment 811 or located otherwise along the peripheral border portion 119. Alternatively, the on/off switch 640 can be eliminated and the light assembly 800 is powered on by simply inserting the battery into the battery compartment and is powered off by simply removing the battery from the battery compartment.

It will also be appreciated that the light assembly 800 can be incorporated into other aspects of the living art medium 110. For example, in the illustrated living art medium 110, there is a fireplace and the light assembly 800 can be positioned relative to the fireplace indicia such that the fireplace appears to glow when the light source 820 is illuminated.

In accordance with the present invention, the living art article 100 generally comprises a piece of framed artwork featuring live flowers contained within a vase that can create a combined piece of art with a singular design.

The living art article of the present invention is thus a piece of framed artwork featuring live flowers contained within a vase that would create a combined piece of art with a singular design. The live flower feature is constructed with a vase with in a case. You are able to add water to the vase to aid in keeping the flowers fresh without causing damage to the picture. The water can be drained through the bottom of the picture frame through a drainage that is constructed within the picture. The vase has a filtration feature which allows the vase from being clogged and allows the water to be drained properly. The draining mechanism valve is located and attached by the trap door at the bottom of the picture frame for easy access. The living art can also have a water tight LED light feature that highlights and accentuates the flower feature. The living art picture frame consists of two singular frames that are screwed together to make one complete piece of art work.

The living art article can be produced by numerous watering and mechanicals components including clay, plaster, plastic, wood and metal. The back drop of the picture can be created by all different types of back grounds. It can be created in all different type of shapes and sizes.

The appealing feature of the living art article is the ease of use, durability, versatility in design and aesthetic appeal. Homeowners can purchase the living art article to add décor in the home. The living art article can also be used in of hospitals, hotels/motels, banks, funeral home, and casinos. The living art article can be used virtually anywhere art worked can be displayed.

The concept of living art article is unique in the way it displays live flowers in homes and business then what is currently out in the market. The living art article water feature and water tight LED light feature is the reasoning for the patentable request.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A living art article comprising:
    a rear frame member that is configured for attachment to a support surface;
    a front art medium that is coupled to the rear frame member and includes graphic indicia and includes a first receptacle that protrudes outwardly from a front face of the front art medium, the first receptacle having a closed first end and an opposite open second end and being configured for receiving and holding a liquid; and
    a drain assembly that is associated with at least one of the rear frame member and the front art medium, the drain assembly having a drain line that is in fluid communication with a hollow interior of the first receptacle and is in communication with a drain outlet that is accessible along one of the rear frame member and the front art medium.

2. The living art article of claim 1, wherein the rear frame member includes a peripheral border portion and an inner portion, the peripheral border portion protruding forward of a rear wall of the rear frame member so as to define a recessed inner portion and wherein the front art medium includes a peripheral border portion and an inner portion, the peripheral border portion of the front art medium being configured and positioned to cover the peripheral border portion of the rear frame member, while the inner portion of the front art medium being configured for reception within the recessed inner portion.

3. The living art article of claim 2, wherein the inner portion of the front art medium defines a rear wall of the front art medium which is coupled to the rear wall of the rear frame member by one or more fasteners.

4. The living art article of claim 2, wherein the inner portion of the front art medium extends rearward relative to the peripheral border portion of the front art medium.

5. The living art article of claim 3, wherein the first receptacle is located within the inner portion of the front art medium.

6. The living art article of claim 2, wherein a space is formed between the rear wall of the front art medium and the rear wall of the rear frame member when the front art medium is coupled to the rear frame member.

7. The living art article of claim 6, wherein at least a first portion of the drain line is disposed within the space formed between the rear wall of the front art medium and the rear wall of the rear frame member, the first portion of the drain line including a first end that is in fluid communication with the hollow interior of the first receptacle, wherein a second portion of the drain line is at least partially disposed within a hollow cavity formed in the peripheral border portion of the rear frame member, the second portion being in fluidly communication with the drain outlet.

8. The living art article of claim 7, further including a drain outlet door that is positionable between an open position in which the drain outlet is accessible and a closed position in which the drain outlet is concealed, the door being coupled to the peripheral border portion of the rear frame member and is disposed about and in covering relationship to an opening that forms an entrance into the hollow cavity of the peripheral border portion of the rear frame member.

9. The living art article of claim 8, further including a valve that is in fluid communication with the drain line and is positionable between a closed position in which liquid flowing in the drain line is prevented from flowing out of the drain outlet and an open position in which the liquid flowing in the drain line can exit through the drain outlet.

10. The living art article of claim 9, wherein the valve is coupled to an inner face of the door.

11. The living art article of claim 8, wherein in the closed position, the door is concealed by the peripheral border portion of the front art medium when viewing the living art article from a front view as a result of the peripheral border portion extending below the door.

12. The living art article of claim 1, further including a second receptacle for removable insertion into the first receptacle, the second receptacle being configured to hold a living plant object and including a plurality of holes formed therein to allow the liquid within the first receptacle to flow into a hollow interior of the second receptacle.

13. The living art article of claim 12, wherein a top end of the second receptacle includes a flange member that is configured to seat against and be disposed over a top edge of the first receptacle.

14. The living art article of claim 1, wherein the liquid comprises water.

15. The living art article of claim 1, further including a light assembly that includes a light source positioned to emit light into a hollow interior of the first receptacle and a power source operatively connected to the light source.

16. The living art article of claim 15, wherein the power source is accessible along a bottom edge of the rear frame member.

17. The living art article of claim 1, further including a drain outlet door that is coupled to an edge of the rear frame member and is positionable between an open position in which the drain outlet is accessible and a closed position in which the drain outlet is concealed by a peripheral portion of the front art medium.

18. The living art article of claim 1, wherein the front art medium is detachably coupled to the rear frame member by a plurality of fasteners.

19. A living art article comprising:
a rear frame member that is configured for attachment to a support surface, wherein the rear frame member includes a peripheral border portion and an inner portion, the peripheral border portion protruding forward of a rear wall of the rear frame member so as to define a recessed inner portion;
a front art medium that is coupled to the rear frame member and includes graphic indicia and includes a first receptacle that protrudes outwardly from a front face of the front art medium, the first receptacle having a closed first end and an open opposite second end and being configured for receiving and holding a liquid, wherein the front art medium includes a peripheral border portion and an inner portion, the peripheral border portion of the front art medium being configured and positioned to cover the peripheral border portion of the rear frame member, while the inner portion of the front art medium being configured for reception within the recessed inner portion; and
a drain assembly that is integral to at least one of the rear frame member and the front art medium, the drain assembly having a drain line that is in fluid communication with a hollow interior of the first receptacle and is in communication with a drain outlet that is accessible along the peripheral border portion of the rear frame member, the drain assembly including a drain outlet door that is coupled to the peripheral border portion of the rear frame member and is positionable between an open position in which the drain outlet is accessible and a closed position in which the drain outlet is concealed by the peripheral border portion of the front art medium.

* * * * *